United States Patent [19]

Kendrick et al.

[11] Patent Number: 4,968,050

[45] Date of Patent: Nov. 6, 1990

[54] MOBILE PRONE STANDER HAVING ADJUSTABLE AXIS OF INCLINATION

[75] Inventors: Talton C. Kendrick, San Francisco; Sterling D. Wiemken, Fremont; Christopher Lacson, Portola Valley, all of Calif.

[73] Assignee: Luconex, Inc., Foster City, Calif.

[21] Appl. No.: 492,272

[22] Filed: Mar. 7, 1990

Related U.S. Application Data

[63] Continuation of Ser. No. 256,343, Oct. 11, 1988, abandoned.

[51] Int. Cl.$^5$ .......................... A61H 3/04; B62M 1/14

[52] U.S. Cl. ...................................... 280/250.1; 5/62; 280/47.16; 297/DIG. 4; 297/DIG. 10

[58] Field of Search .......................... 280/250.1, 47.16; 297/DIG. 4, DIG. 10; 180/65.5, 65.2; 5/86, 62, 81 R; 128/80 R, 80 G

[56] References Cited

U.S. PATENT DOCUMENTS

| | | | |
|---|---|---|---|
| 3,042,131 | 7/1962 | Dovci | 180/41 |
| 3,107,105 | 10/1963 | Heriford | 280/211 |
| 3,127,188 | 3/1964 | Greub . | |
| 3,165,314 | 1/1965 | Clearman et al. | 272/70.3 |
| 3,226,128 | 12/1965 | Grier, Jr. . | |
| 3,493,245 | 2/1970 | Nabinger | 280/250 |
| 3,629,880 | 12/1971 | van Rhyn | 5/86 |
| 3,839,755 | 10/1974 | Iannucci . | |
| 4,029,089 | 6/1977 | Mulholland | 128/80 R |
| 4,054,319 | 10/1977 | Fogg, Jr. et al. | 297/466 |
| 4,099,277 | 7/1978 | Watkins . | |
| 4,155,416 | 5/1979 | Ansmus | 180/214 |
| 4,245,847 | 1/1981 | Knott . | |
| 4,333,681 | 6/1982 | Nelson | 297/83 |
| 4,620,714 | 11/1986 | Davis | 280/250.1 |
| 4,744,578 | 5/1988 | Stearns | 280/250.1 |
| 4,779,881 | 10/1988 | Baker . | |
| 4,802,542 | 2/1989 | Houston et al. . | |

FOREIGN PATENT DOCUMENTS

| | | | |
|---|---|---|---|
| 3316014 | 11/1984 | Fed. Rep. of Germany . | |
| 1589584 | 5/1970 | France . | |

OTHER PUBLICATIONS

European Search Report for EP 89 11 7814.

*Primary Examiner*—Mitchell J. Hill
*Attorney, Agent, or Firm*—Townsend and Townsend

[57] ABSTRACT

A mobile prone stander includes a mobile frame having a pair of central drive wheels and a plurality of caster wheels to maintain stability. A body support frame is pivotally mounted on a central housing which is suspended between a pair of frame members which comprise the mobile frame. The elevation of the central housing is adjustable to accomodate changes in the length of the body frame, and a motor driven unit within the central housing provides powered raising and lowering of the body support frame.

19 Claims, 5 Drawing Sheets

MOBILE PRONE STANDER HAVING ADJUSTABLE AXIS OF INCLINATION

This is a continuation of application Ser. No. 07/256,343, filed Oct. 11, 1988, now abandoned.

BACKGROUND OF THE INVENTION 1. Field of the Invention

The present invention relates generally to ambulatory devices for individuals who have lost the use of their legs. More particularly, the invention relates to the design and construction of a prone stander having a mobile frame and an inclinable body support which allows the user to move between a vertical or standing position and a forwardly inclined position.

Numerous devices have been developed over the years to enable persons who have lost use of their legs to obtain some degree of mobility. The most familiar device, of course, is the wheelchair where the user, in a sitting position, is able to move by manually rotating a pair of large drive wheels on either side of the seat frame.

Although vastly successful, wheelchairs alone are not able to provide for all needs of the immobilized individual. In many instances, an immobilized person will desire to move about in a generally standing position, which is not possible with most wheelchairs. Additionally, it is frequently desirable to have the ability to lean or incline forward, a capability provided by few, if any, wheelchairs.

To provide these additional capabilities, devices referred to as mobile prone standers have been developed. Generally, these devices comprise a mobile frame having a pair of large drive wheels similar to those seen on conventional wheelchairs. Rather than having a seat for the user, however, the mobile prone stander will include an inclinable body support frame or platform where the user is strapped in a standing position facing the body support frame. The body support frame is able to incline about an axis located relatively near the axis of the main drive wheels so that the user is able to reach the main drive wheels regardless of the position of the support frame. Thus, the user is able to move about while in the standing or any other position. Such mobile prone standers are particularly useful for developmentally disabled children who benefit from an increased ability to explore their surroundings which is unavailable with conventional wheelchairs.

Previous designs for mobile prone standers, however, have suffered from certain disadvantages. In particular, the ability to adjust the size and positioning of the body support frame in order to accommodate different sizes of users has been quite limited. Although the body frames provided are generally extendable, the ability to adjust the position of the axis of inclination has generally been quite limited. Moreover, the designs have generally not been suited to the use of motorized drive means for raising and lowering the body support frames.

For these reasons, it would be desirable to provide a mobile prone stander having a body support platform where the axis of inclination is adjustable over a wide range of heights, usually being at least about 6 inches, preferably being 12 inches or greater. It would also be desirable if the design provided for a motor driven mechanism for raising and lowering the body platform which would be able to accommodate the mechanism for adjusting the height of the axis of inclination of the body support platform.

2. Description of the Background Art

U.S. Pat. No. 4,744,578 describes a mobile prone stander having a body platform which inclines about an axis fixed relative to the mobile frame. While the length of the body platform is adjustable, there is no mechanism provided to adjust the ground clearance to accommodate the increase in its length. U.S Pat. No. 4,620,714 describes a mobile prone stander which is similar to the previously-described design in many respects, except that the position of the body support platform may be horizontally and vertically adjusted by positioning serrated plates 29 and 30 which are attached to the mobile frame. The degree of vertical adjustment, however, is very limited and the mechanical stability of the attachment appears inadequate. Moreover, the design is not amenable to motorized drive of the body platform. If such a drive were mounted on the mobile frame, it would be very difficult to provide a drive linkage which could accommodate the change of body platform position. The following U.S. patents are of interest as disclosing devices for assisting disabled persons in standing and moving while in a standing position: U.S. Pat. Nos. 4,333,681; 4,155,416; 4,054,319; 4,029,089; 3,629,880; 3,493,245; 3,165,314; 3,107,105; and 3,042,131.

SUMMARY OF THE INVENTION

According to the present invention, a mobile prone stander includes improved means for attaching an inclinable body support frame to a mobile frame. The mobile frame includes a pair of spaced-apart elongate frame members, and a central drive wheel is mounted on each frame member near its midpoint. Usually, caster wheels will be provided at each end of the elongate frame members in order to provide stability. A central housing is secured between the elongate frame members, and the manner of securing allows vertical adjustment of the housing relative to the frame members over a relatively wide distance, typically being over at least 6 inches, preferably being over at least about 12 inches. The body support frame, in turn, is inclinably secured to the central housing so that the axis of inclination is raised and lowered together with the housing. In this way, extension of the body frame member, particularly extension of a lower foot platform portion of the body frame member, can be accommodated with sufficient ground clearance being maintained and the user's center of gravity remaining as low as possible at all times. Keeping the axis of inclination as low as possible facilitates the user reaching the ground when the body support frame is inclined forward and provides a particularly compact profile for storage.

In the preferred embodiment, a motorized drive assembly for raising and lowering the body support frame is mounted within the central housing. Such a design has the advantage that the linkage between the motorized drive and the body support frame is not disturbed when the elevation of the axis of inclination of the body support frame is adjusted. Such an integrated design where the motorized drive is mounted within a housing attached to the body support frame is not found in the prior art, as discussed above.

Further in the preferred embodiment, the central housing is attached to the elongate frame members by a pair of cantilever plates which are removably attached at preselected, opposite angles (relative to horizontal) to the central housing. In this way, with both cantilever plates inclined downward, the central housing may be offset downward, while with the cantilever plates oriented upward, the central housing will be raised upward. Thus, the reversible cantilever plates allow the central housing to assume either of two basic configurations, i.e., a raised configuration and a lower configuration, which may be obtained simply by reversing the positions of the cantilever plates. It will be appreciated that the use of an angled or canted cantilever plate is not essential to the present invention and that other designs that provide for reversible, offset mounting of the central housing will also be suitable.

The central housing will usually also include a plurality of vertically-spaced attachment points for the cantilever plates. The spacing between the attachment points will be much less than the difference in elevation provided by reversal of the cantilever plates. Thus, both gross and fine adjustment of the elevation of the housing may be achieved by selecting the orientation of the cantilever plates and by choosing which attachment points are to be utilized, respectively. Preferably, by properly choosing the space between the attachment points, a continuous adjustment of the housing elevation over equal increments may be achieved.

In a particular aspect of the present invention, knee pads are provided on the body support frame for supporting the users knees. The knee pads each include a pair of contact pads which are vertically spaced-apart and which contact the user's legs just above and below the kneecap. The knee pads are pivotally mounted on a universal joint so that they are self-aligning and can adjust for maximum user comfort.

In a second particular aspect of the present invention, the body support frame comprises a central shank portion, a downwardly extendible foot support portion, and an upwardly extendible chest support portion. The shank portion comprises an elongate body having a pair of parallel axial bores, while both the foot support portion and the chest support portion include a pair of parallel extension members which are received in the upper and lower ends of the bores, respectively. Such construction provides a high degree of rigidity and resistance to twisting, while simplifying attachment to the housing. Conveniently, the central shank portion may be pivotally attached to the central housing using a single clevis formed on the housing.

DESCRIPTION OF THE SPECIFIC EMBODIMENTS

Figure 1:
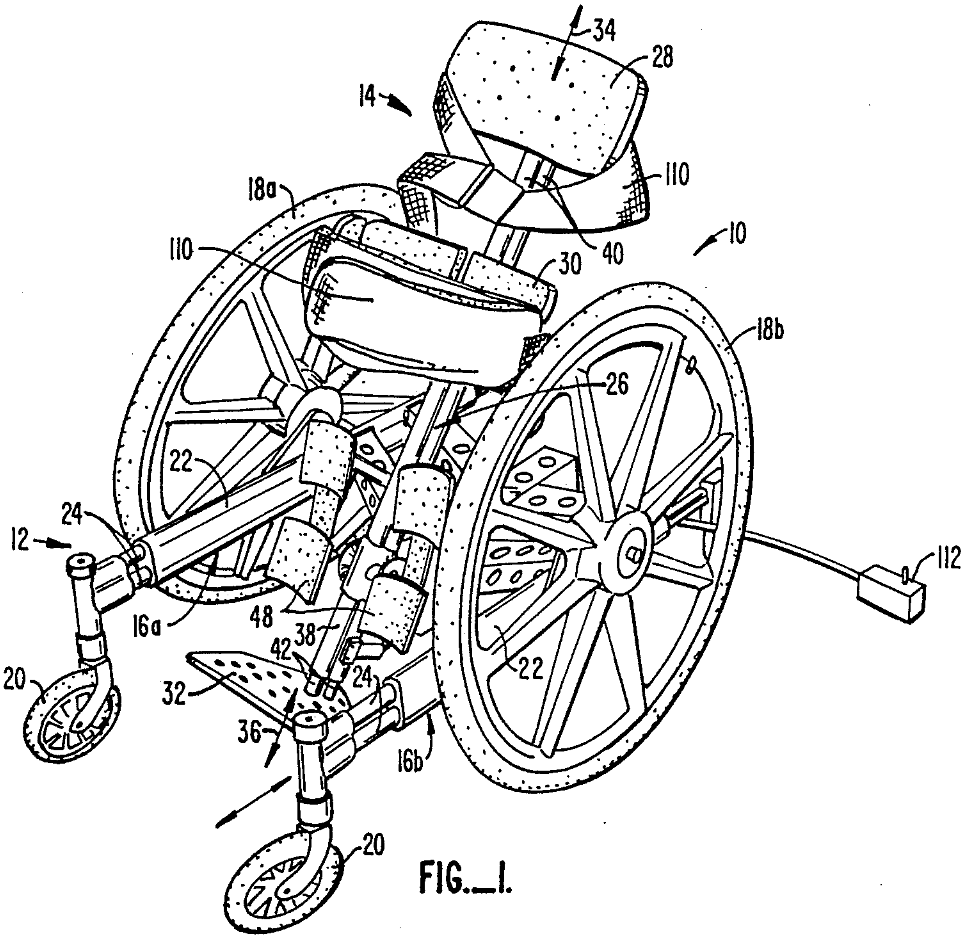
FIG. 1 is a perspective view of the mobile prone stander of the present invention, taken from the rear.

Referring to FIG. 1, a mobile prone stander constructed in accordance with the principles of the present invention includes a mobile frame 12 and a body support frame 14. The mobile frame 12, in turn, comprises a pair of elongate frame members **16*a* and 16*b* which are spaced-apart and which will usually be parallel to each other. A central drive wheel 18*a* or 18*b* is rotatably attached to each of the elongate frame members 16 near the midpoint thereof. Caster wheels 20 will be attached to each end of the elongate frame member 16, in order to provide stability for the mobile frame 12**. Skids or other stabilizing mechanisms (not illustrated) might be provided in place of at least some of the caster wheels, but will generally not be preferred.

The elongate frame members 16 will each include a central shank portion 22, where the caster wheels 20 are mounted on extension rods 24 which are received in bores formed within the shank portion 22. In this way, the caster wheels 20 are extendible away from the shank portion 22, as best observed in FIG. 5 where an extended caster wheel is illustrated in broken line.

The body support frame 14 includes a central frame member 26 having a chest support 28, waist support 30, and foot support 32 mounted thereon. The chest support 28 is extendible upward as indicated by arrow 34, while the foot support 32 is extendible downward as illustrated by arrow 36.

Figure 2:
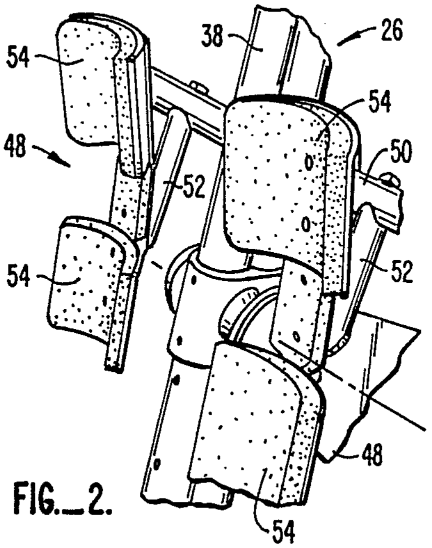
FIG. 2 is a detail view illustrating the mounting of the knee pads of the present invention on the body support frame.

The central frame member 26 includes a shank portion 38 which is constructed similarly to the shank portion 22 of frame members 16. The shank portion 38 includes a pair of parallel bores extending axially therethrough, with the upper end of the bores receiving a pair of rod extensions 40 and the lower end of the bores receiving a pair of rod extensions 42. All references to upper and lower made herein and in the claims will be with reference to the prone stander being in an upright orientation as illustrated in FIGS. 1–3. The chest support member 28 is mounted on upper rod extension members 40, while the foot support member 2 is mounted on lower rod extensions 42. In this way, the length of the body support frame 14 may be extended both by raising chest support 28 and lowering the foot support 32.

Referring now also to FIG. 2, a pair of knee pads 48 are pivotally attached to a cross bar 50 having depending shafts 52. Each knee pad includes a pair of contact pads 54 which are vertically spaced-apart and contoured to fit a user's legs just above and below the kneecap. The knee pads 48 are attached to shafts 52 by a universal joint which allows full pivoting in two plane, thus providing for self-alignment of the pads to the user's knees. This construction of the knee pads has been found to provide particularly comfortable support for the user over extended periods.

Figure 3A:
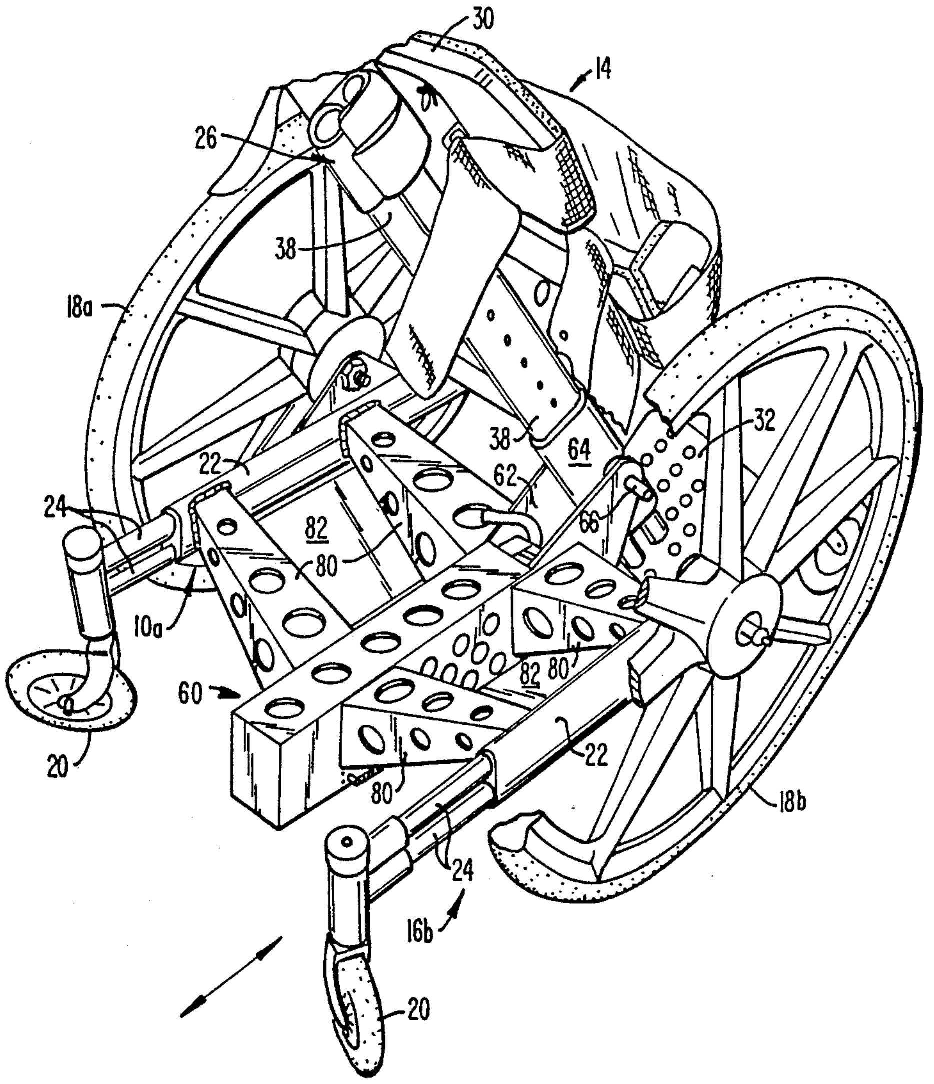
FIG. 3A is an enlarged view of the mobile prone stander of FIG. 1, taken from the front with portions broken away, illustrating the central housing in its uppermost position.
Figure 3B:
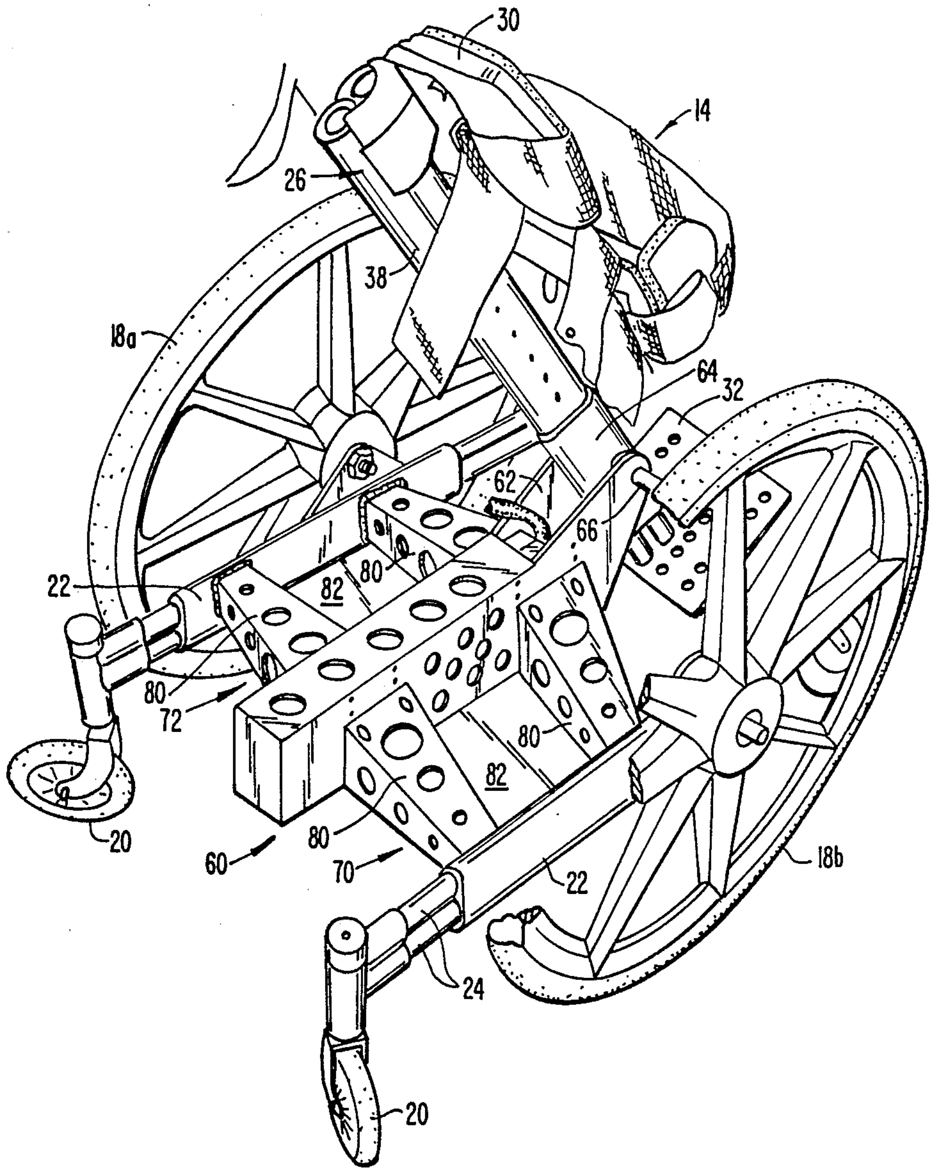
FIG. 3B is an enlarged view of the mobile prone stander of FIG. 1, taken from the front with portions broken away, illustrating the central housing in its lowermost position.

Referring now to FIGS. 3A and 3B, the shank portion 38 of central frame member 26 of body support frame 14 is pivotally attached to a central housing 60, as will now be described in detail. Central housing 60 is an elongate rectangular box having a plurality of apertures formed therein to reduce its weight. A clevis 62 is formed at the rear end (to the right in FIGS. 3A and 3B) of the central housing 60 and receives a reinforcement sleeve 64 formed over the shank portion 38 of body support frame 4. A pivot pin 66 extends through the clevis 62 and into the reinforcement sleeve 64, allowing the body support frame 14 to freely incline or rotate about the axis defined by pin 66. While the shank portion 38 of body support frame 14 can rotate relative to the housing 60, it is not otherwise able to move relative to the housing. That is, no provisions are made for altering the position of the axis of rotation relative to the housing 60 itself. The chest support 28 and foot support 32, however, are able to be raised and lowered, respectively, relative to the central housing.

In order to accommodate the different lengths to which the foot support 32 may be extended, the central housing 60 is provided with a vertically adjustable attachment mechanism which includes first and second cantilever plates 70 and 72. Each cantilever plate 70 and 72 includes a pair of beam members 80 and a support plate 82 therebetween. The cavity defined between the beams 80 may be used to mount a battery for powering a motor driven support frame inclination mechanism, as described further below.

The beam members 80 are detachably secured to both the central housing 60 and the shank portions 22 of the frame member 16. Conveniently, bolts or screws 90 (FIG. 4A) may be utilized. Equivalent quick attach-/detach systems would also be suitable. Each end of the beam members 80 is cut off at an angle which is oblique to the plane which is normal to the axis of the beam member. That is, when the beam members are secured to both the central housing 60 and the shank portions 22, they will deviate upward or downward relative to the horizontal plane between the frame members 16. As illustrated in FIG. 3A, the beam members 80 (and thus the cantilever plates 70 and 72) are directed generally downward in the direction from the frame members 22 toward the central housing 60. Thus, the central housing 60 will be carried in a relatively low or downward configuration. In FIG. 3B, in contrast, the beam members 80 (and thus the cantilever plates 70 and 72) are inclined upward in the direction from the frame members 22 toward the central housing. Thus, the central housing is carried in a relatively upper or elevated configuration. Thus, the central housing can be raised and lowered simply by reversing the attachment positions of the beam members 80 of the cantilever plates 70 and 72. Other such reversible, offset attachment mechanisms, such as L-shaped brackets, will also be suitable.

Figure 4A:
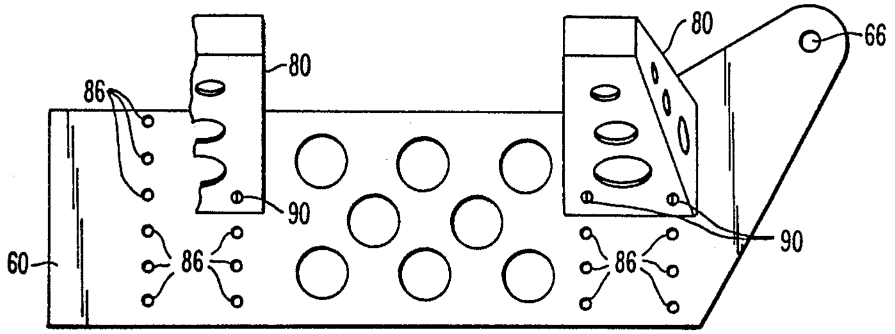
FIGS. 4A and 4B are detail views illustrating the central housing of the present invention, illustrating the difference in height achieved by reversing the cantilever support plates, with the lowermost position illustrated in FIG. 4A and the uppermost position illustrated in FIG. 4B.
Figure 4B:
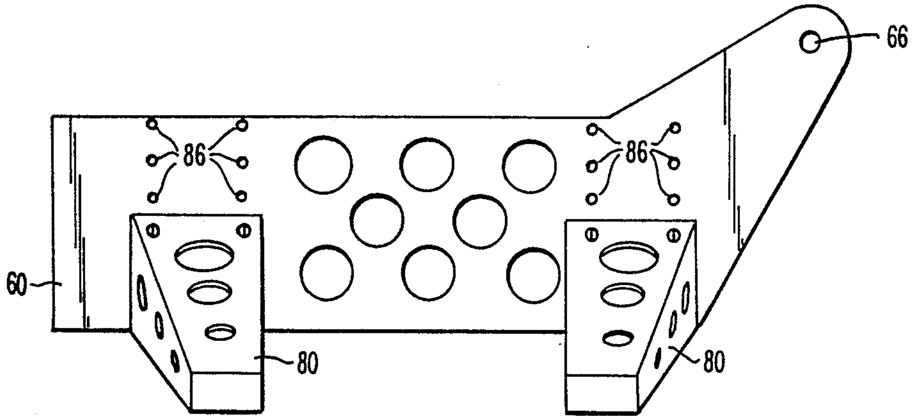
Figure 4C:
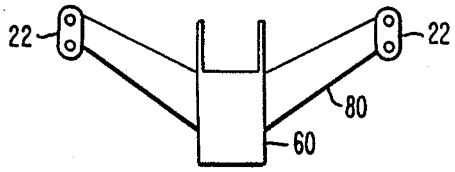
FIGS. 4C and 4D are front views corresponding to FIGS. 4A and 4B, respectively.
Figure 4D:
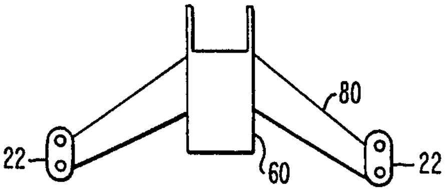

In addition to the major change in elevation which is achieved by reversing the orientation of the cantilever plates 70 and 72, smaller changes in elevation can be achieved by varying the height attachment point of the beam member 80 to the central housing 60 (or to the frame members 16 if sufficient elevation is available). As best observed in FIGS. 4A to 4D, a plurality of attachment points 86 are provided on each side of the central housing 60. The elevation of the central housing 60 may be adjusted by the incremental distances between these attachment points, even while the cantilever plates 70 and 72 remain in a fixed orientation. As shown in FIGS. 4A and 4D, the beam members 80 of a cantilever plate are shown in their downward orientation, with the central housing in its downwardmost configuration. Central housing 60, however, could be moved upward simply by unfastening the screws 90 which secure it to the attachment points 86, and resecuring the next lower set of attachment points. This would raise the pivot point 66 by a distance equal to the vertical space between attachment points 86. Similarly, the central housing 60 is shown in its fully upward configuration in FIGS. 4B and 4D. The housing 60, however, could be incrementally lowered by moving the beam members 80 to each of the next upper attachment points 86.

Figure 5:
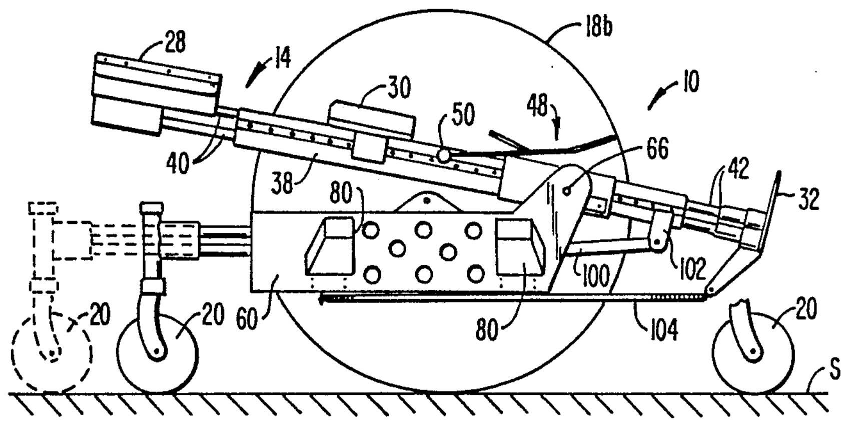
FIG. 5 is a schematic side view illustrating the mobile prone stander of the present invention with its body support frame being in its fully forwardly inclined position.

Referring now to FIG. 5, the body support frame 14 is raised and lowered by a motorized linkage 100 which extends from the central housing 60 to a clevis or abutment 102 which is attached to the lower end of shank portion 38. A tension spring 104 is provided to balance the body frame 14 and assist in raising the frame against the weight of the user. It will be appreciated that the motor and linkage 100 need not be adjusted each time the central housing is raised or lowered to effect a corresponding change in the elevation of pivot point 66. That is, the housing 60 and body support frame 14 form an integral unit whose height can be adjusted with the need to alter any of the connections between the housing 60 and the frame 14.

In use, a patient will normally mount the mobile prone stander 10 with the body support frame 14 in a substantially vertical orientation. If the body support frame 14 needs to be adjusted, the elevation of the central housing 60 may be correspondingly adjusted so that the foot support member 32 lies just above the support surface S, which may be a floor or the ground. By keeping the axis of inclination as close to the ground S as possible, the user can approach the ground more closely as the frame 14 is inclined forward. This allows smaller users, particularly children, better access to the ground.

After mounting the body support frame 14, the user will be buckled in using the straps 110 best observed in FIG. 1. The user may then employ the controller 112 to raise or lower the body support frame 14, as desired. The control activates the motor drive which is housed in housing 60 and which axially translates link arm 100 to raise or lower the body support frame 14. At all times, the user is able to manually move the mobile prone stander by turning the central drive wheels 18*a* and 18*b* in a manner similar to a conventional wheelchair.

Although the foregoing invention has been described in some detail by way of illustration and example for purposes of clarity of understanding, it will be obvious that certain changes and modifications may be practiced within the scope of the appended claims.

What is claimed is:

1. A mobile prone stander comprising:

a pair of spaced-apart frame members;

a central drive wheel rotatably secured to each frame member near its midpoint;

means attached to each frame member for providing balance;

a central housing positioned between the frame members, said housing having an attachment point;

means for selectively attaching the housing to the frame members in either a first position where the housing is elevated relative to the frame members or a second position where the housing is lowered relative to the frame members; and a body support frame attached to the housing, said body support frame being capable of inclining relative to the housing and having an extendible length where ground clear is accommodated by vertically adjusting the attachment point of housing.

2. A mobile prone stander as in claim 1, wherein the body support frame includes a shank portion, a downwardly extendible foot support portion, and an upwardly extendible chest support portion.

3. A mobile prone stander as in claim 2, wherein the shank portion includes a pair of parallel axial bores, the foot support portion includes a pair of extension members received in a lower end of said axial bores, and the chest support portion includes a pair of extension members received in an upper end of said axial bores.

4. A mobile prone stander as in claim 1, wherein the body support frame includes a pair of knee pads.

5. A mobile prone stander as in claim 4, wherein the knee pads each comprise a pair of contact pads spaced-apart so that they are positioned above and below a user's kneecap when the user is mounted on the support frame.

6. A mobile prone stander as in claim 1, further comprising motorized means attached to the central housing for raising and lowering the body support frame.

7. A mobile prone stander comprising:

a pair of spaced-apart frame members;

a central drive wheel rotatably secured to each frame member near its midpoint;

at least one caster wheel attached to each frame member to provide balance;

a central housing positioned between the frame members and having a clevis at one end;

a body support frame having a shank portion and a downwardly extendible foot support portion, where said shank portion is received in the clevis of the central housing, whereby the body support frame is able to incline relative to the housing;

means attached to the central housing for shifting the body support frame between a vertical position and an inclined position; and means for selectively attaching the housing to the frame members in either position where the housing is elevated above the frame members or a second position where the housing is lowered below the frame members.

8. A mobile prone stander as in claim 7, wherein the means for vertically offset attachment includes first and second cantilevers, said first cantilever removably attached to one side of said central housing and extending to a first of the frame members and said second cantilever removably attached to the opposite side of the housing and extending to a second of the frame members, said cantilevers each being inclined relative to horizontal so that the housing may assume a raised or a lowered configuration depending on the orientation of the cantilevers.

9. A mobile prone stander as in claim 8, wherein the cantilevers include a plurality of vertically spaced-apart attachment points which allow further vertical adjustment of the housing within each of the raised and lowered configurations.

10. A mobile prone stander as in claim 7, wherein one caster wheel is attached to each end of each frame member.

11. A mobile prone stander as in claim 10, wherein the caster wheels are extendible from the frame members.

12. A mobile prone stander as in claim 7, wherein the body support frame includes a shank portion, a downwardly extendible foot support portion, and an upwardly extendible chest support portion.

13. A mobile prone stander as in claim 12, wherein the shank portion includes a pair of parallel axial bores, the foot support portion includes a pair of extension members received in a lower end of said axial bores, and the chest support portion includes a pair of extension members received in an upper end of said axial bores.

14. A mobile prone stander as in claim 11, wherein the body support frame includes a pair of knee pads.

15. A mobile prone stander as in claim 14, wherein the knee pads each comprise a pair of contact pads spaced apart so that they are positioned above and below a user's kneecap when the user is mounted on the support frame.

16. A mobile prone stander comprising:

a pair of spaced-apart frame members;

a central drive wheel rotatably secured to each frame member near its midpoint;

means attached to each frame member for providing balance;

a central housing positioned between the frame members;

means for vertically adjustable attachment of the housing to the frame members;

a body support frame attached to the housing, said body support frame being capable of inclining relative to the housing and having an extendible length where ground clearance is accommodated by vertically adjusting the housing; and a pair of knee pads each comprising a pair of contact pads spaced-apart so that they are positioned above and below a user's kneecap when the user is mounted on the support frame.

17. A mobile prone stander as in claim 16, wherein the body support frame includes a shank portion, a downwardly extendible foot support portion, and an upwardly extendible chest support portion.

18. A mobile prone stander as in claim 17, wherein the shank portion includes a pair of parallel axial bores, the foot support portion includes a pair of extension members received in a lower end of said axial bores, and the chest support portion includes a pair of extension members received in an upper end of said axial bores.

19. A mobile prone stander as in claim 16, further comprising means mounted in the central housing for raising and lowering the body support frame.

* * * * *